United States Patent
Elezzabi et al.

(10) Patent No.: US 7,133,579 B2
(45) Date of Patent: Nov. 7, 2006

(54) HIGH-SPEED MAGNETO-OPTIC MODULATOR

(75) Inventors: Abdulhakem Y. Elezzabi, Edmonton (CA); Scott E. Irvine, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 218 days.

(21) Appl. No.: 10/687,763

(22) Filed: Oct. 20, 2003

(65) Prior Publication Data

US 2004/0085614 A1  May 6, 2004

Related U.S. Application Data

(60) Provisional application No. 60/419,112, filed on Oct. 18, 2002.

(51) Int. Cl.
G02F 1/295 (2006.01)

(52) U.S. Cl. .................................. 385/6; 385/1; 385/4
(58) Field of Classification Search .................. 385/4, 385/6

See application file for complete search history.

(56) References Cited

U.S. PATENT DOCUMENTS

| 6,542,647 B1 | 4/2003 | Minemoto et al. ............ 385/6 |
| 6,912,080 B1 * | 6/2005 | Minemoto .................. 359/283 |
| 2003/0218792 A1 | 11/2003 | Minemoto .................. 359/280 |

* cited by examiner

*Primary Examiner*—Jennifer Doan

(57) ABSTRACT

A magneto-optic modulator and method are provided. An optical waveguide having a magneto-optic active medium is magnetized by a biasing magnetic field. The magnetization of the magneto-optic active medium is modulated thereby causing a variation in the Faraday effect on optical signals passing through the magneto-optic medium. The result is a polarization modulated optical signal.

34 Claims, 14 Drawing Sheets

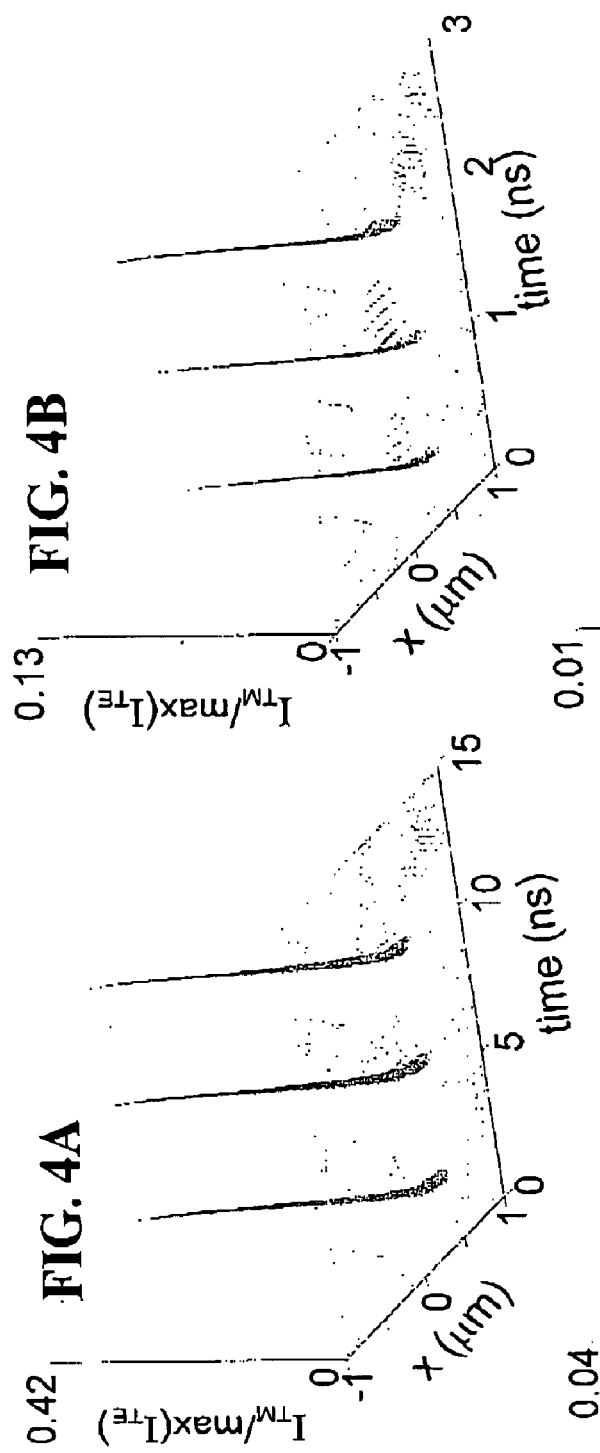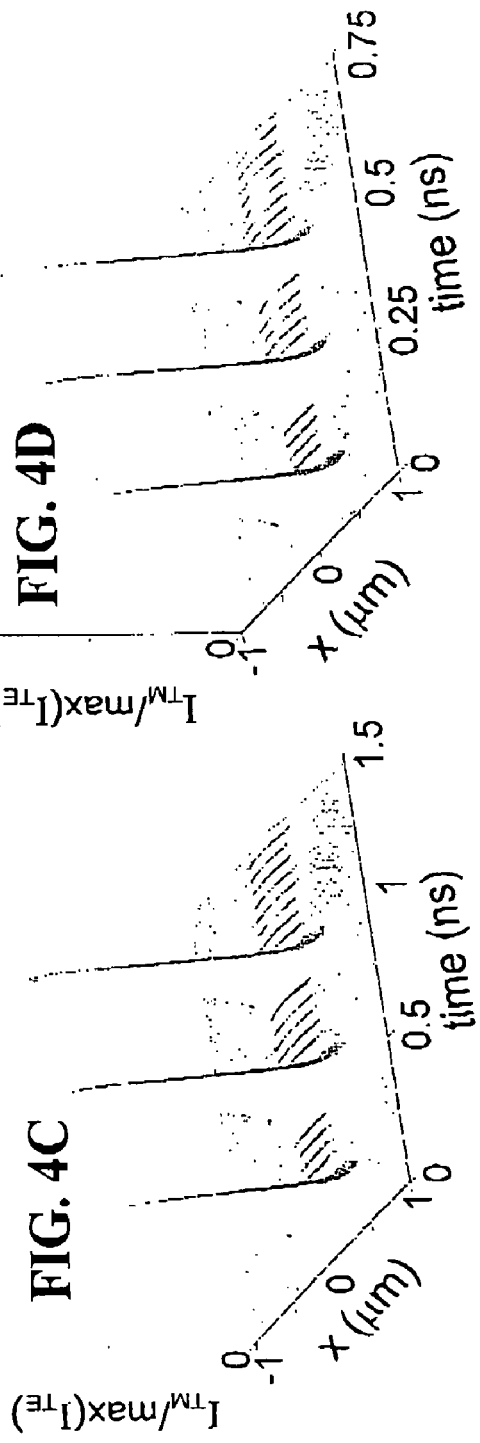

electrical          optical

HIGH-SPEED MAGNETO-OPTIC MODULATOR

This Application claims Priority From U.S. Provisional Application Ser. No. 60/419,112 Filed Oct. 18, 2002 which is hereby incorporated by reference in its entirety.

FIELD OF THE INVENTION

The invention relates to optical telecommunication systems and more particularly to magneto-optic modulation of optical signals.

BACKGROUND OF THE INVENTION

As information processing requirements for telecommunications and optical data networking increase, the demand for high bandwidth devices grows. High-speed modulators are key components for wideband optical transmission systems. While much research has been devoted to modulation schemes employing electro-optic or acousto-optic effects, little attention has been paid to modulation techniques involving the magneto-optic (MO) effect. Typical high-speed modulators utilize electro-optic effects in nonlinear crystals, semiconductor structures, and organic polymers. Alternative high-bandwidth modulators based on the magneto-optic (MO) effect have not been fully explored due to the lack of MO materials with ultrafast response times and high Faraday rotation.

SUMMARY OF THE INVENTION

According to a first broad aspect the invention provides for a magneto-optic modulator having an optical waveguide having a magneto-optic active medium, a biasing magnetic field generator adapted to apply a biasing magnetic field in said magneto-optic active medium, and a magnetization modulator adapted to modulate a magnetization of the magneto-optic active medium, by which during operation of the biasing magnetic field generator, the magnetization modulator causes modulation of an optical signal passing though the optical waveguide.

In some embodiments of the invention, during operation of the biasing magnetic field generator the optical signal propagates in a first direction, and the biasing magnetic field generated by the biasing magnetic field generator is oriented in a second direction and has a significant component perpendicular to the first direction.

In some embodiments of the invention, the magnetization modulator comprises a conducting microstrip line oriented in a third direction adapted to generate in the magneto-optic active medium a magnetic field having a significant component parallel to the first direction for modulating a magnetization of the magneto-optic medium when current is passed through the conducting microstrip line, by which passing a current signal though said conducting microstrip line during operation of the biasing magnetic field generator modulates the optical signal passing though the magneto-optic active medium.

In some embodiments of the invention the magneto-optic active medium comprises a rare earth element substituted Iron Garnet.

In some embodiments of the invention the magneto-optic active medium comprises Bismuth substituted Yttrium Iron Garnet (Bi-YIG).

In some embodiments of the invention the biasing magnetic field generator is adapted to apply a biasing magnetic field such that the magneto-optic modulator operates in a non-resonant state.

In some embodiments of the invention the biasing magnetic field generator is adapted to apply a biasing magnetic field such that the magneto-optic modulator operates in a resonant state.

In some embodiments of the invention the biasing magnetic field generator is adapted to apply a biasing magnetic field having a magnetic field strength such that a signal modulation caused by the magnetization modulator has a Fourier spectrum whose DC to 3-dB point frequencies lie in a relatively flat region of a frequency-amplitude curve of the magneto-optic modulator below a ferromagnetic resonance frequency of the magneto-optic modulator, whereby the magneto-optic modulator operates in a non-resonant state.

In some embodiments of the invention the biasing magnetic field generator is adapted to apply a biasing magnetic field having a magnetic field strength such that a signal modulation caused by the magnetization modulator has a Fourier spectrum whose peak frequencies lie in a peaked region of a frequency-amplitude curve of the magneto-optic modulator substantially at a ferromagnetic resonance frequency of the magneto-optic modulator, whereby the magneto-optic modulator operates in a resonant state.

In some embodiments of the invention the first direction and the second direction are substantially perpendicular to each other, and the second direction and the third direction are substantially parallel to each other.

In some embodiments of the invention the magneto-optic active medium has a thin film oriented in a plane defined by the first and second directions.

Some embodiments of the invention provide for a cladding layer in contact with the magneto-optic active medium, in which the conducting microstrip line is in contact with the cladding layer.

In some embodiments of the invention the conducting microstrip line is in direct contact with the magneto-optic active medium.

In some embodiments of the invention the biasing magnetic field is such that it causes a homogeneous static magnetization saturation in the magneto-optic active medium.

In some embodiments of the invention the magneto-optic active medium is such that when magnetized it causes a Faraday rotation of polarization states of optical signals propagating through the magneto-optic active medium in a direction non-perpendicular to a direction of magnetization of the magneto-optic active medium.

Some embodiments of the invention provide for a polarization analyzer for generating an intensity modulated optical signal.

According to a second broad aspect, the invention provides for a method of magneto-optic modulation of an optical signal propagating through a magneto-optic active medium, the method including generating in the magneto-optic active medium a biasing magnetic field to generate a magnetization of the magneto-optic active medium, and generating in the magneto-optic active medium a magnetic field adapted to modulate a magnetization of the magneto-optic medium.

According to a third broad aspect, the invention provides for a method of magneto-optic modulation of an optical signal propagating in a first direction through a magneto-optic active medium, the method including generating in the magneto-optic active medium a biasing magnetic field in a second direction having a significant component perpendicular to the first direction; and generating in the magneto-optic active medium a magnetic field in a third direction having a significant component parallel to the first direction for modulating a magnetization of the magneto-optic medium.

In some embodiments of the invention, the biasing magnetic field is such that the step of generating in the magneto-optic active medium a magnetic field adapted to modulate the magnetization of the magneto-optic medium causes a non-resonant state in the magneto-optic medium.

In some embodiments of the invention, the biasing magnetic field is such that generating in the magneto-optic active medium a magnetic field adapted to modulate the magnetization of the magneto-optic medium causes a resonant state in the magneto-optic medium.

In some embodiments of the invention, the biasing magnetic field has a magnetic field strength such that generating in the magneto-optic active medium a magnetic field adapted to modulate the magnetization of the magneto-optic medium causes an optical signal modulation having a Fourier spectrum whose DC to 3-dB point frequencies lie in a relatively flat region of a frequency-amplitude curve of below a ferromagnetic resonance frequency of the magneto-optic active medium, whereby the magneto-optic medium exhibits a non-resonant state.

In some embodiments of the invention, the biasing magnetic field has a magnetic field strength such that generating in the magneto-optic active medium a magnetic field adapted to modulate the magnetization of the magneto-optic medium causes an optical signal modulation having a Fourier spectrum whose peak frequencies lie in a peaked region of a frequency-amplitude curve substantially at a ferromagnetic resonance frequency of the magneto-optic active medium, whereby the magneto-optic medium exhibits a resonant state.

Some embodiments of the invention further provide for passing the optical signal through a polarization analyzer after it has passed through the magneto-optic active medium for generating an intensity modulated optical signal.

According to a fourth broad aspect, the invention provides for a media for magneto-optic modulation comprising a magneto-optic active medium for magneto-optic modulation of an optical signal passing therethrough, and a conducting medium located proximate the magneto-optic active medium and adapted to generate a magnetic field for modulating a magnetization of the magneto-optic medium when a current is passed through said conducting medium.

In some embodiments of the invention, the magneto-optic active medium comprises a layer of magneto-optic active material.

In some embodiments of the invention, the conducting medium comprises a layer of conducting material having a surface substantially parallel to a surface of the layer of magneto-optic active material, said surface of the layer of conducting material and said surface of the layer of magneto-optic active material facing each other and being proximate to each other.

In some embodiments of the invention, the surface of the layer of conducting material and the surface of the layer of magneto-optic material are affixed to each other.

In some embodiments of the invention the surface of the layer of conducting material and the surface of the layer of magneto-optic material are spaced apart by a cladding layer situated therebetween.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which:

FIG. 4 is a graph depicting a simulation of spatio-temporal output of the magneto-optic modulator corresponding to an input of three sequential current pulses at four selected pulse widths of 1 ns, 200 ps, 100 ps and 50 ps with $b_y$=60, 90, 375, 750 mT, respectively;

DETAILED DESCRIPTION OF THE PREFERRED EMBODIMENTS

Modulators based on the MO effect in iron garnets offer a tunable operating frequency, excellent long-term reliability, and high thermal stability. As liquid phase epitaxy growth technologies for iron garnets advance, MO films of high optical quality with high Faraday rotation, low saturation magnetization, and relatively low absorption in the infrared spectral window will give rise to a host of new high-speed magneto-photonic devices.

Early work by Tien et al. demonstrated MO modulation rates up to 80 MHz in a $Y_3Ga_{1.1}Sc_{0.4}Fe_{3.5}O_{12}$ film using a serpentine transmission line. This experiment established the principle of MO modulation using iron garnet waveguide films. This early work by Tien et al. also demonstrated MO modulation rates up to 80 MHz in a $Y_3Ga_{1.1}Sc_{0.4}Fe_{3.5}O_{12}$ garnet film using periodic reversal of the magnetization. A mode conversion efficiency of 52% for transverse magnetic (TM) to transverse electric (TE) was reported.

Current advancements in the growth of Bismuth substituted Yttrium Iron Garnet (Bi-YIG) materials have resulted in MO films with ultrahigh bandwidth capabilities and high Faraday rotation ($10^4$ deg/cm). Advancements in the application of bismuth substituted yttrium iron garnets (Bi-YIG), lutetium iron garnet (LuIG), and terbium gallium garnet (TGG) to microwave photonics has led to the realization of novel high-speed magneto-photonic devices, such as modulators, deflectors, and magnetic field sensors. In particular, MO modulators offer distinct advantages, such as tunable bandwidth, dual operational mode (resonant or non-resonant), and low absorption in the near and mid infrared spectral region. Moreover, several fields of technology could utilize high speed polarization modulated optical signals produced by MO modulators, including but not limited to communications, spectroscopy, and high speed imaging.

Further explorations demonstrating the high-bandwidth capability of bismuth-substituted yttrium iron garnet (Bi-YIG) materials were performed by Elezzabi et al., specifically an ultra fast sampling $(Y_{0.6}Bi_{0.4}LuPr)_3(FeGa)_5O_{12}$ garnet film was used to detect magnetic field transients produced by a lithographically patterned micro-coil driven with picosecond current pulses. The bandwidth of the sampling system has been demonstrated to scale with the ferromagnetic resonance frequency and the system had a maximum detection bandwidth of 82.3 GHz, revealing the high-speed response of Bi-YIG and its potential for MO modulation. Later experiments by Prabhakar et al., using a $(BiLu)_3Fe_5O_{12}$ garnet film, showed a non-resonant MO modulation at 5.75 GHz with a 3 GHz bandwidth. However, the conversion efficiency (TM to TE) was low (~2%). These experiments show the high-bandwidth response of Bi-YIG films and their potential use in magneto-photonic devices.

Figure 1:
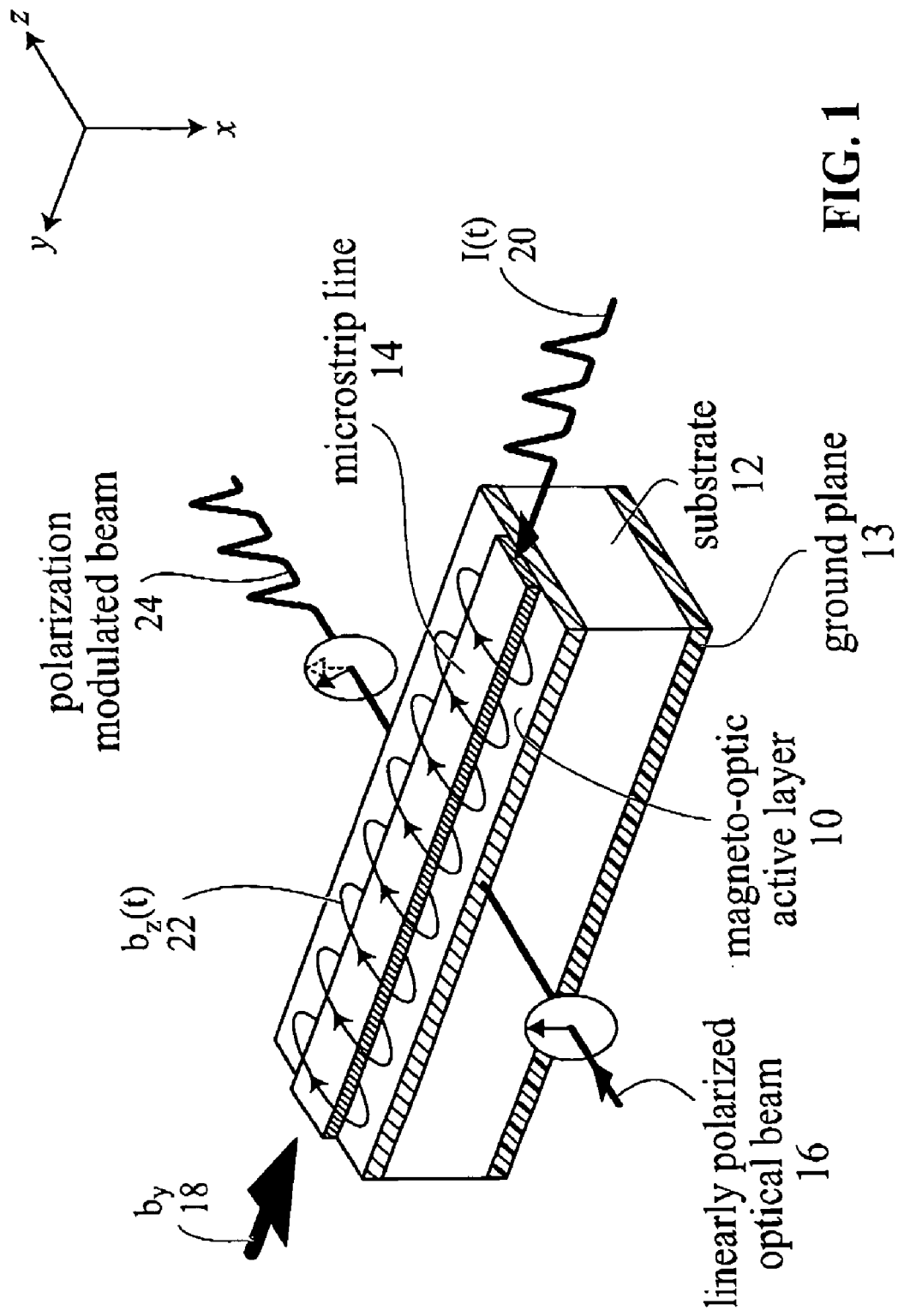
FIG. 1 is a schematic diagram of a Bi-YIG magneto-optic modulator constructed according to a preferred embodiment of the invention.

Referring to FIG. 1, a multi-GHz guided wave MO modulator built according to a preferred embodiment of the invention is described. This particular embodiment of the invention is a Bi-YIG waveguide film modulator adapted for high speed MO modulation. Since the magnetization can rotate easily in the plane of the film, a non-traveling wave configuration is selected to efficiently switch the magnetization along the direction of optical propagation. As a result of the Faraday effect, the time-varying component of the magnetization along the direction of optical propagation imparts a corresponding polarization modulation on the optical beam. This polarization modulation could then be converted to an intensity modulation via an output polarization means. By changing an externally applied biasing magnetic field, a wide-range of tunability may be demonstrated for frequencies between 1 MHz and 1.8 GHz. The high bandwidth may be achieved by operating the device in a non-resonant mode well below the ferromagnetic resonance (FMR) frequency of the Bi-YIG film. The MO modulator has the potential of operating at multi-gigahertz bandwidths by tuning the applied static magnetic field. Depending on the desired application, the modulator can be operated at the FMR or below it.

With respect to the structure of the magneto-optic modulator, an optical waveguide 10 made of a film of an active MO medium is grown on a substrate 12, for example, an active 1.0 µm thick epi-layer of Bi-YIG, grown by liquid phase epitaxy on a (111)-oriented, 450 µm thick gadolinium gallium garnet $(GdGa)_5O_{12}$ substrate 12. The MO film has in-plane magnetization, M, with saturation magnetization, $M_S$, which could be for example 16 mT. A cladding layer having a similar refractive index as the substrate 12 may be used to effectively confine the lowest order modes in the optical waveguide 10 (not shown in the diagram). The thickness of the cladding layer could be, for example, 1.0 µm. In an example embodiment, the measured Faraday rotation at 630 nm and 1550 nm could be 11000°/cm and ~2500°/cm, respectively. A layer of titanium may be deposited onto the surface of the Bi-YIG waveguide film as an adhesion layer for a thick, 50Ω terminated transmission line 14, or alternatively, the transmission line 14 may be placed on the cladding layer. The thickness of the layer of titanium could be for example 100 nm, while the thickness of the 50Ω terminated transmission line 14 could be for example 100 µm. A ground plane 13 may be utilized to ground the far side (not shown) of the terminated transmission line 14. On the edge of the optical waveguide 10, optical signals 16 from a continuous-wave diode laser (not shown) which could for example be an optical beam which is TE or TM polarized (or a combination of both TE polarized and TM polarized) is focused and edge-coupled into the thin film Bi-YIG optical waveguide 10. The active length of the device should be set to take into account the optical absorption of the MO film at the operating wavelength. Magnetic field biasing means (not shown) generates a static biasing magnetic field $b_y$, 18.

Although the embodiments herein incorporate a planar waveguide structure, various other waveguide structures could be used including but not limited to ridge waveguides, photonic bandgap arrangements or structures, and periodic or spatially modulated structures.

With respect to the function of the magneto-optic modulator, the biasing magnetic field, $b_y$, 18, is applied having a significant component perpendicular to the direction of propagation of the optical signal 16, z, thus ensuring homogeneous static magnetization across the film. A time varying current signal I(t) 20 propagating along the transmission line 14 in the y-direction produces a time-varying magnetic field b(t) having a component along the z-direction, $b_z(t)$ 22, underneath the microstrip line 14 within the MO active region along the direction of the optical beam propagation. The $b_z(t)$ component 22 acts to tip the magnetization, M, along the propagation direction of the optical beam 16. This field component by tipping the magnetization away from the y-direction also results in precessional motion of the magnetization. As a result of the Faraday effect, the optical beam experiences a rotation of its polarization, and a linearly polarized light beam 16 propagating along the z-direction in the optical waveguide 10 will experience a polarization rotation due to the component of the magnetization along the z-direction. The degree of modal conversion is proportional to the magnetization component along the direction of propagation. The static biasing in-plane magnetic field, $b_y$, 18, applied perpendicular to the optical axis ensures the return of M to its initial orientation after the passage of the electrical transient. The output 24 from the optical waveguide 10 is collimated, and if intensity modulation is desired, the polarization modulation of the output 24 may be converted into an intensity modulation via a polarization analyzer. The modulated intensity of the output beam 24 may be detected using high-speed light detectors.

As described above, to drive the magnetization, the direction of the static biasing magnetic field, $b_y$ 18, is set perpendicular to both the transient magnetic field, $b_z(t)$ 22, resulting from the propagation of a time-varying current signal I(t) 20, and to the optical propagation direction. For this in-plane magnetic biasing arrangement the magnetization vector precesses about $b_y$ 18. The largest magnetization deflection is achieved when the Bi-YIG is resonantly excited at its ferromagnetic resonance (FMR) frequency. The peak FMR frequency can be tuned by varying the magnitude of the biasing DC magnetic field, $b_y$ 18. Depending on the desired application, the modulator can be operated at the FMR frequency or below it. However, for non-resonant operation, the modulation amplitude is expected to be lower than the resonant modulation case.

With reference to the remaining figures, the performance and operation of the MO modulator is described.

Figure 2:
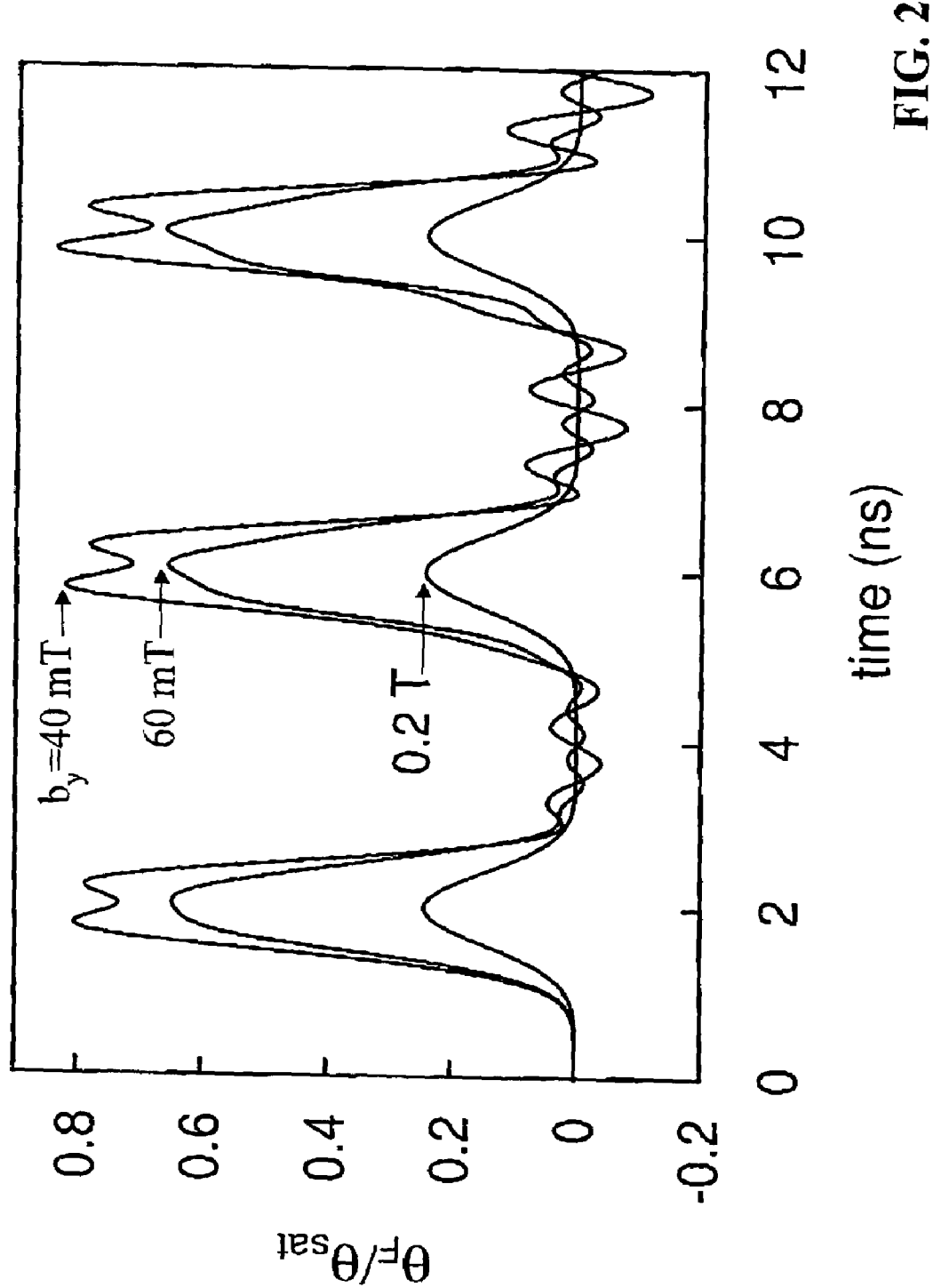
FIG. 2 is a graph depicting a simulation of the time evolution of the normalized Faraday rotation at various biasing magnetic fields for an input of three sequential modulating current pulses with a FWHM of 1 ns.

FIG. 2 illustrates the temporal evolution of the normalized Faraday rotation in response to the application of for example 500 mA Gaussian current pulses with for example a full width at half maximum (FWHM) of 1 ns. A peak transient magnetic field, $b_z$=50 mT, due to this example current pulse, is calculated at a distance of 2 µm, from the simple model of a current carrying transmission line. The temporal shape of $\theta_F$ varies as the biasing magnetic field changes. For low biasing magnetic fields, the rotation shows distinct oscillations, whose amplitudes and frequencies are strongly correlated with the in-plane biasing magnetic field. It has been shown previously that the origin of such oscillations is due to the ferromagnetic precession of the magnetization (ferromagnetic resonance) in the presence of static and time-varying magnetic fields. For a given value of a static magnetic field, the tipping angle of the magnetization vector is proportional to the spectral density in the current pulse on resonance.

For biasing field values $b_y$>0.118 T, $\theta_F$ follows the temporal shape of the current pulse exactly; however, the amount of rotation is reduced by ~50% or greater compared to the lowest field value. The reduction in the amplitude is attributed to the fact that a stronger transient field is required to tip the magnetization away from the direction of the biasing magnetic field. Clearly, the biasing magnetic field is an important parameter to consider since it influences the operating speed of the device, the temporal shape of the modulated signal, and the MO response. An optimum field Preferably is chosen so as to maximize signal amplitude while maintaining the necessary temporal signal shape.

Figure 3:
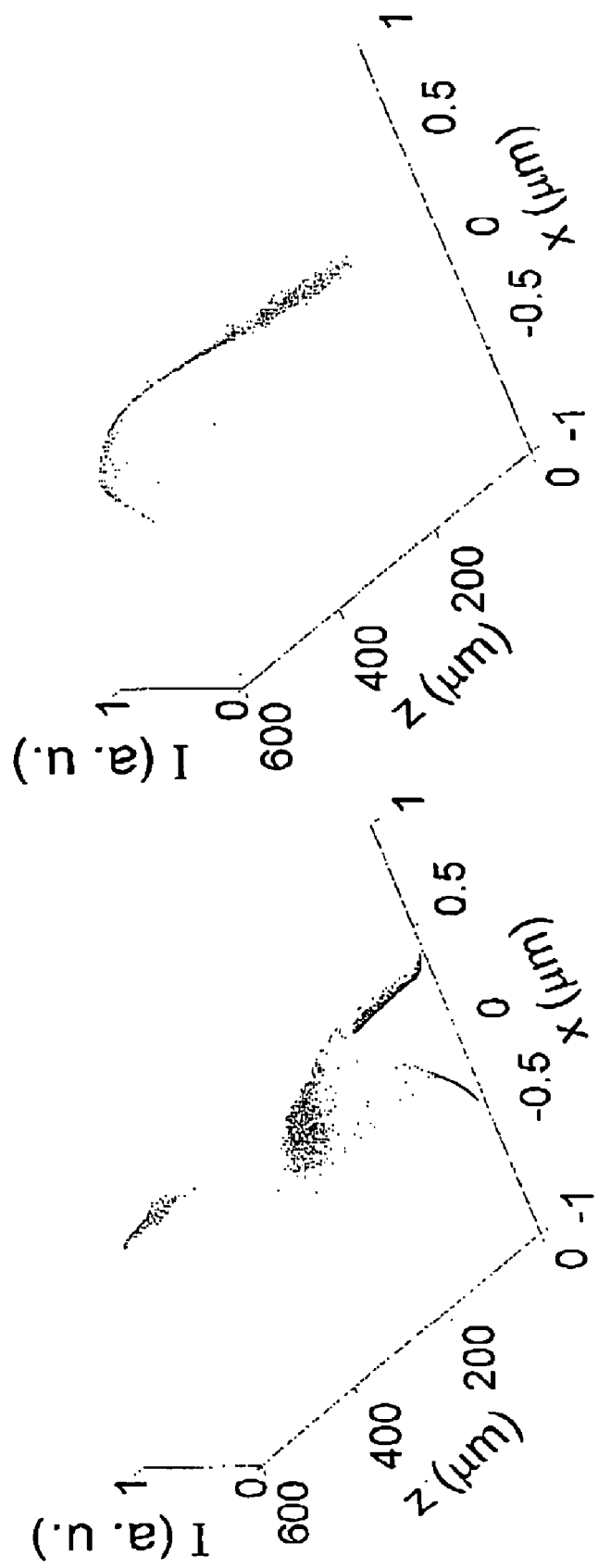
FIG. 3 is a graph depicting a simulation of static TE to TM mode conversion for constant magnetization along the z-direction.

FIG. 3 illustrates the beam propagation simulation of static TE to TM mode conversion in the slab waveguide. In this time-independent simulation, the magnetization is saturated along the z-direction. An example TE mode at 1550 nm is directed into the waveguide having the for example following refractive indices: $n_{cover}$=1.94, $n_{substrate}$=1.94, $n_x$=2.2400, $n_y$=2.2300. Here, the mode is launched with a Gaussian intensity spatial distribution having a FWHM equal to the width of the waveguide. The intensity of the lowest modes is plotted as a function of x and z, showing continuous mode conversion occurring along the length of the waveguide. With the example parameters given above, complete rode conversion occurs at a distance of 396 µm. The conversion distance in general would be different for different parameters. The simulation indicates that static mode conversion can be greatly enhanced with proper choice of film birefringence. Therefore, the value of the birefringent was adjusted to maximize the static mode conversion efficiency. Although optical absorption is not included in the model, the propagation length in the MO film limits the useful interaction length Of the device in this example to 300 µm. It should be noted that the useful interaction length of the device will in general be dependent upon the material. At this distance, the static TE to TM mode conversion reaches 80%. This length and efficiency are material dependent and functions of the wavelength.

In order to provide a realistic representation of an actual modulator performance, a current signal train consisting of three Gaussian 500 mA amplitude pulses is used as the electrical input to the device. The pulse spacing is arbitrarily chosen to be four times longer than the FWHM of a single pulse. FIG. 4 illustrates typical output intensity of the modulator. The electrical pulse train is effectively mapped onto the optical carrier, thus demonstrating the multi-GHz potential of the device. The biasing fields of 0.06, 0.09, 0.375, 0.75 T, for impulses with FWHM of 1 ns, 200 ps, 100 ps, and 50 ps, are chosen in order to maximize the dynamic mode conversions. With these biasing fields, conversion efficiencies of 42%, 11%, 4% and 1% are obtained at FWHM of 1 ns, 200 ps, 100 ps, and 50 ps, respectively. The residual inter-pulse ringing, due to ferromagnetic precession, is shown to be insignificant (<3% of the amplitude of the main signal at a pulse width of 50 ps). At Pulse widths shorter than 200 ps, the pulses show a rise due to the background oscillations but reach steady state amplitude after four sequential pulses Increasing the biasing field will eliminate this effect. Higher conversion efficiency can be Obtained at the expense of signal shape. The values used above are only specific to this simulation and may vary.

Figure 5:
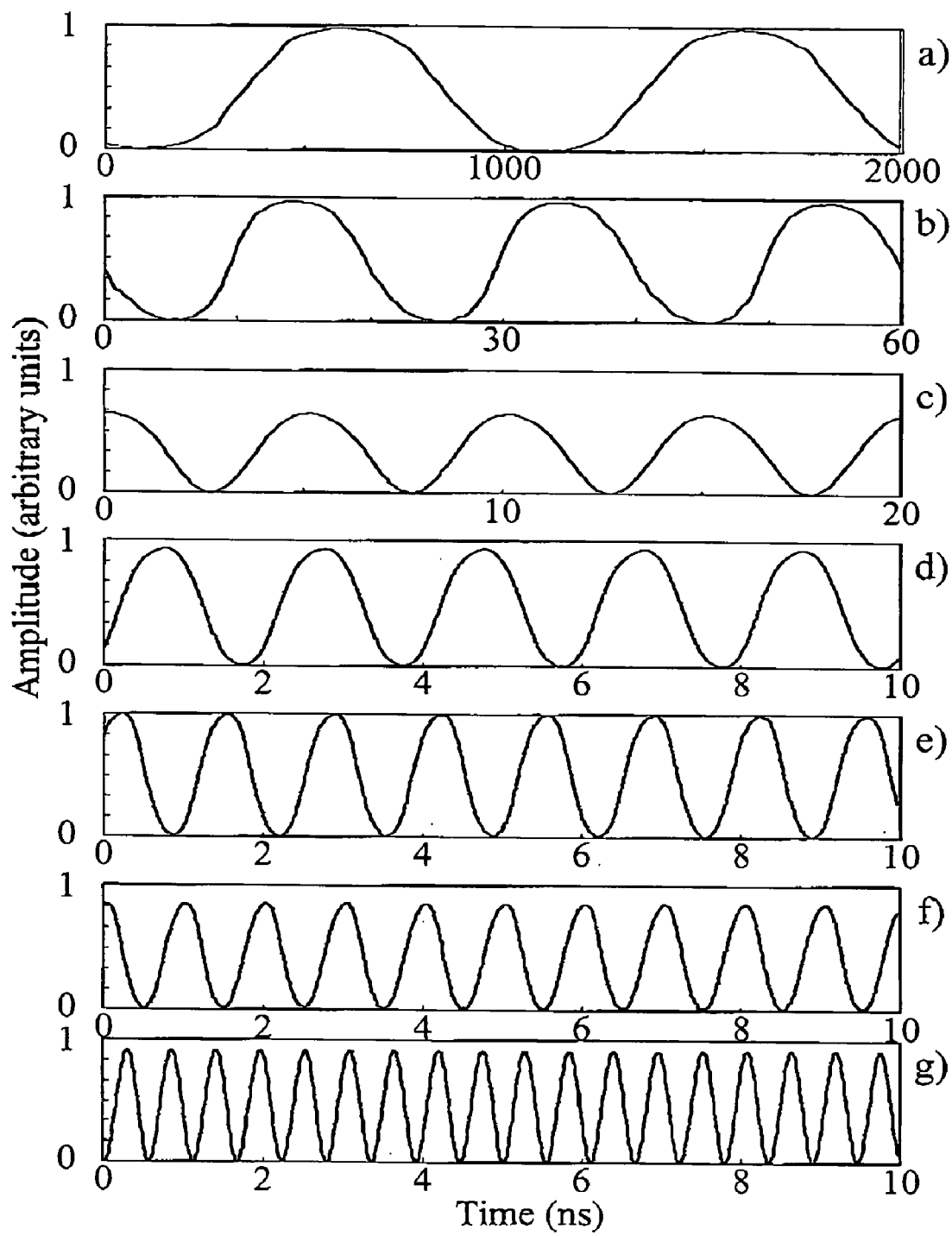
FIG. 5 is a graph depicting resonant output of the MO modulator for various driving signals at frequencies: (a) 1 MHz, (b) 50 MHz, (c) 200 MHz, (d) 500 MHz, (e) 750 MHz, (f) 1 GHz and (g) 1.8 GHz.
Figure 6:
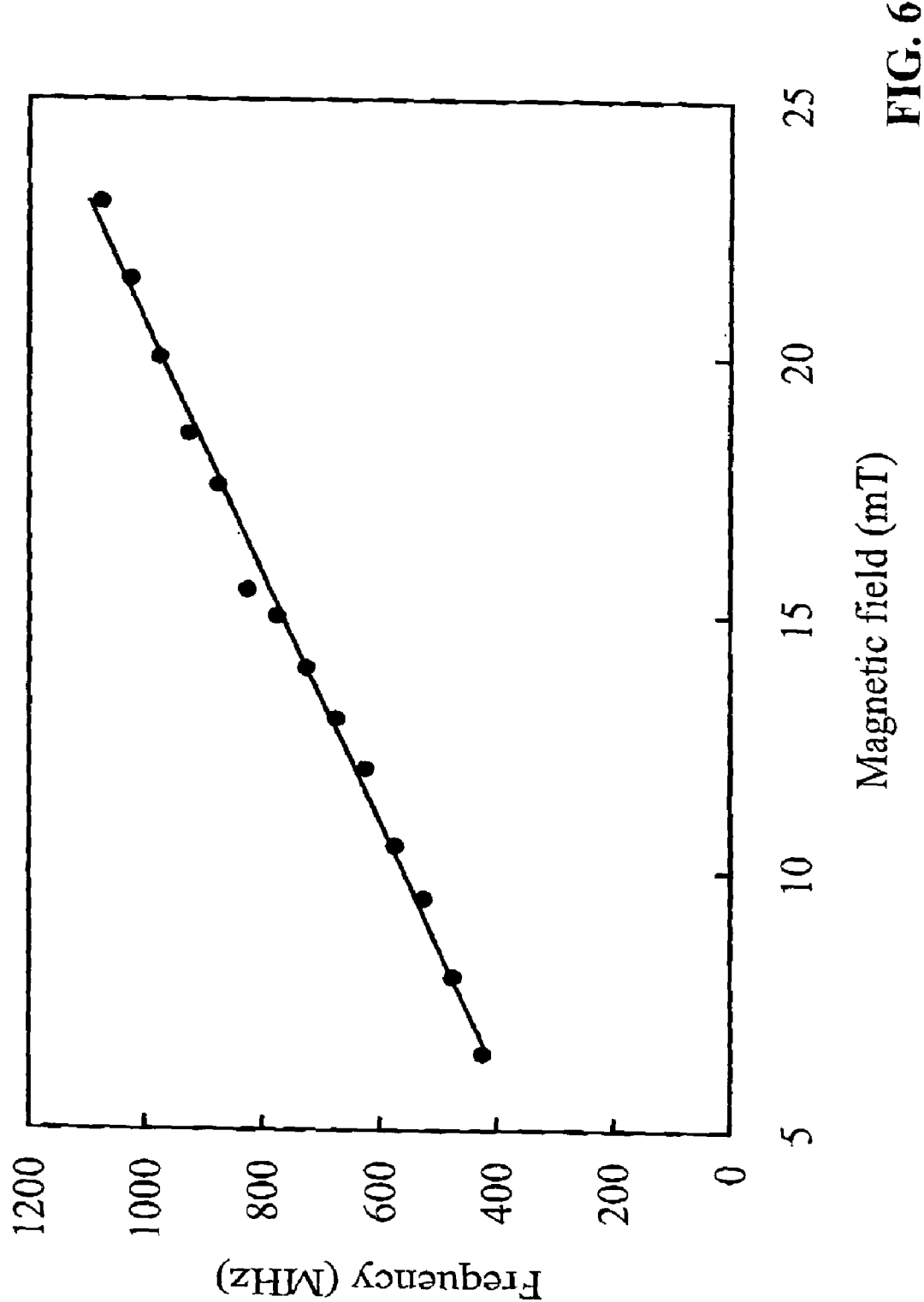
FIG. 6 is a graph depicting ferromagnetic resonance (FMR) frequency as a function of applied biasing magnetic field, in which experimental values (•) are shown.
Figure 7:
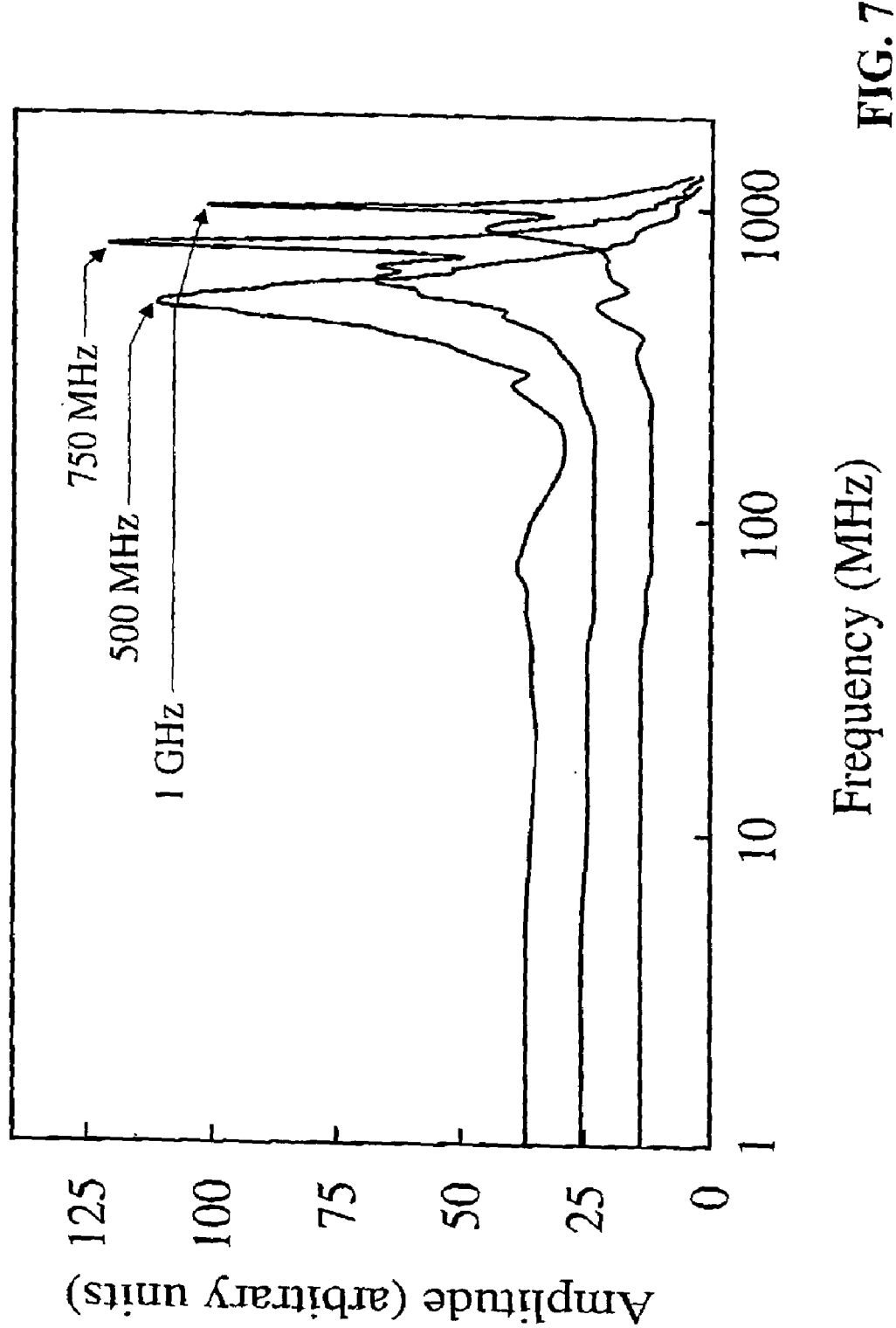
FIG. 7 is a graph depicting frequency sweep curves for peak resonances which appear at: a) 500 MHz, b) 750 MHz, and c) 1 GHz.

FIGS. 5 through 7 are in relation to an example M modulator having a magneto-optic active region of 60 µm, and having a saturation magnetization and measured specific Faraday rotation respectively of 9 mT, and ~5400 deg/cm (at 800 nm).

FIG. 5 illustrates an example resonant output of the example MO modulator for various example driving signals. A low electrical drive power of only 34 mW was used to operate the device between 1 MHz and 1.8 GHz. Here, the amplitude of the current sinusoid was kept constant at 74 $mA_{pp}$, corresponding to a peak-to-peak magnetic field strength of ~0.3 mT at the center of the MO region. The biasing field strengths are adjusted from 6 mT to 45 mT to maximize the signal amplitude at each frequency. In order to ensure a resonance condition for each of the driving sinusoids, resonance tuning at the driving frequency was accomplished by varying the external biasing magnetic field to maximize the modulated signal amplitudes.

FIG. 6 illustrates typical resonant frequencies, from 400 MHz to 1.1 GHz, as a function of the applied biasing magnetic field. The experimental data exhibits a linear relationship, with a slope of 42 GHz/T over this frequency range.

To demonstrate the non-resonant operation of the MO modulator and, thus, its high bandwidth capability, an FMR frequency was selected and the driving frequency was swept over the range from 1 MHz to 1.2 GHz while keeping the biasing magnetic field fixed. FIG. 7 shows the frequency sweeps at three FMR frequencies, 500 MHz, 750 MHz, and 1 GHz with corresponding biasing fields of 8, 14, and 20 mT, respectively. The curves reveal the same overall behavior, peaking at the selected resonance frequency.

Interestingly, the curves exhibit a relatively high response below the peak resonance. For the 500 MHz, 750 MHz, and 1 GHz FMR frequencies, these levels correspond to 33%, 21%, and 14% of the resonance peak amplitude, respectively. This offers the possibility of operating the MO modulator off its FMR frequency at the cost of lower signal modulation amplitude. Such a mode of operation is desirable, as in the case of return to zero switching formats, where a large and nearly uniform bandwidth is required. FIG. 7 illustrates that by utilizing ferromagnetic precession in a Bi-YIG film, two modes of operation (resonant and non-resonant) may be selected from.

FIGS. 8 through 12 are in relation to an example MO modulator having an magneto-optic active region of 60 μm, and having a saturation magnetization and measured specific Faraday rotation respectively of 9 mT, and ~5400°/cm (at 800 nm).

Figure 8:
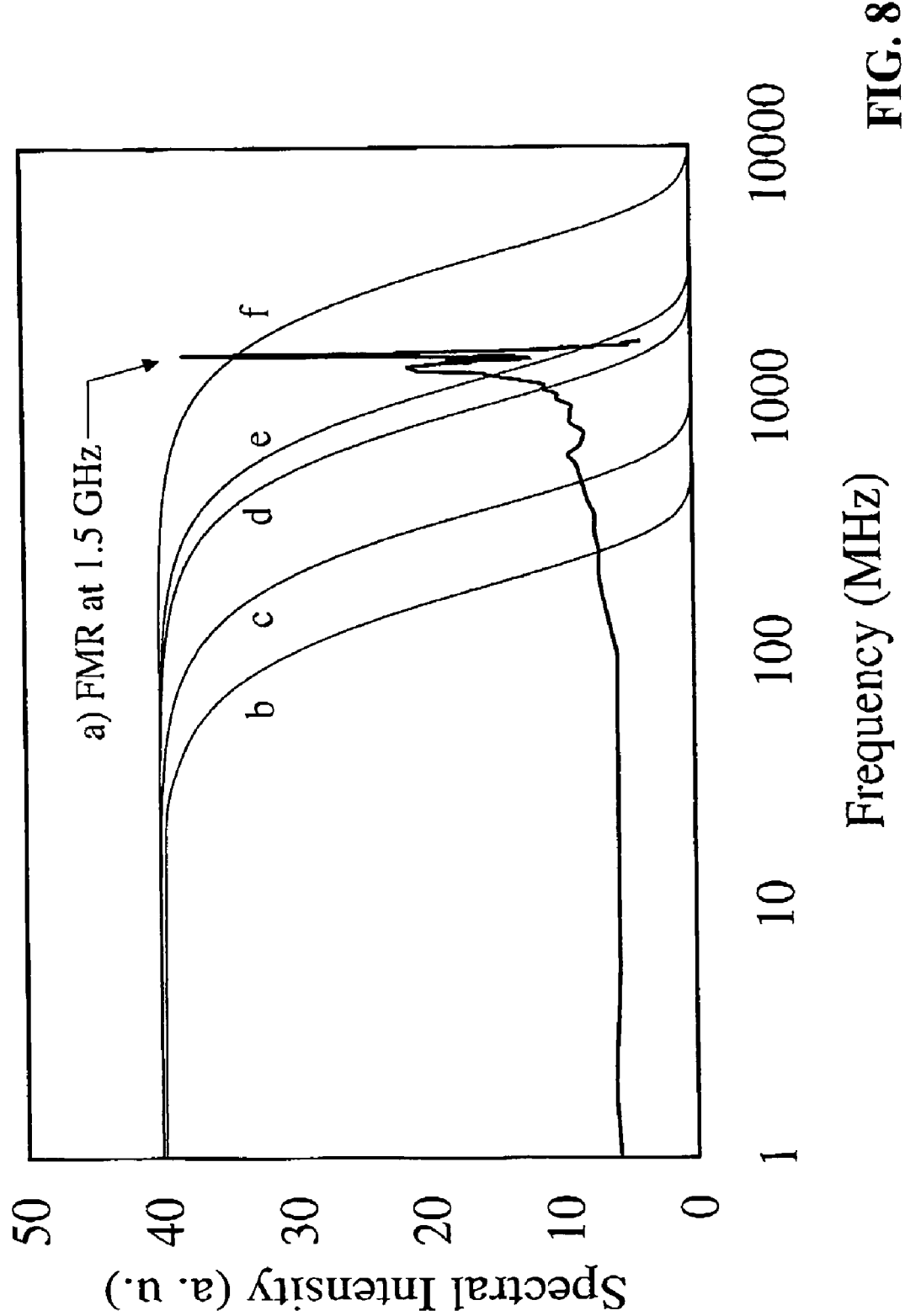
FIG. 8 is a graph depicting a) frequency characteristics of the MO modulator, exhibiting a 1.5 GHz FMR for $b_y$=30 mT, and Fourier power spectra of gaussian pulses of various FWHMS: b) 2 ns, c) 1 ns, d) 500 ps, e) 300 ps, and f) 100 ps.

In order to achieve high-frequency MO modulation, the modulator bandwidth should encompass all the spectral frequencies that comprise the modulating current pulse. Ideally, a constant spectral response provides distortion-free pulse representation if the frequency components, from DC to the 3-dB point of the Fourier spectrum of the electrical pulse, are uniformly weighted. To characterize the MO modulator bandwidth near 1 GHz, single frequency, constant current (74 mA$_{pp}$) electrical signals from a microwave oscillator may be fed into the device, and by setting a fixed value for by and sweeping the frequency from 1 MHz to 1.7 GHz, the modulation level as a function of the driving frequency may be obtained. FIG. 8a illustrates the measured frequency characteristics of the MO modulator for an example $b_y$ of 30 mT and a calculated example peak-to-peak value of $b_z(t)=0.3$ mT at the center of the MO active region. The figure shows a peaked spectrum at 1.5 GHz which drops sharply to zero at 1.8 GHz. The 1.5 GHz peak is attributed to FMR due to the precession of M around $b_y$. Superimposed on FIG. 8 are the calculated Fourier power spectra of five electrical pulses of gaussian shapes with FWHM of 2 ns, 1 ns, 500 ps, 300 ps, and 100 ps (curves b-f). Clearly, pulse widths ≧300 ps can be mapped onto the optical beam with little distortion, since their spectra lie within the uniform spectral region of the modulator bandwidth. However, pulse widths ≦100 ps are not ideal with respect to the previous criterion, as a large portion of the high-frequency components of the pulse spectrum are either over or under represented as they lie either near the FMR peak or outside the MO bandwidth, respectively. The portions of the spectral components which lie on resonance would result in oscillations (at 1.5 GHz) in the optical signal, leading to significant MO signal distortion. Pulses having widths shorter than 100 ps can be represented by increasing the biasing magnetic field, which in turn, will shift the FMR to a higher frequency (i.e. above the bandwidth of the pulse).

Figure 9:
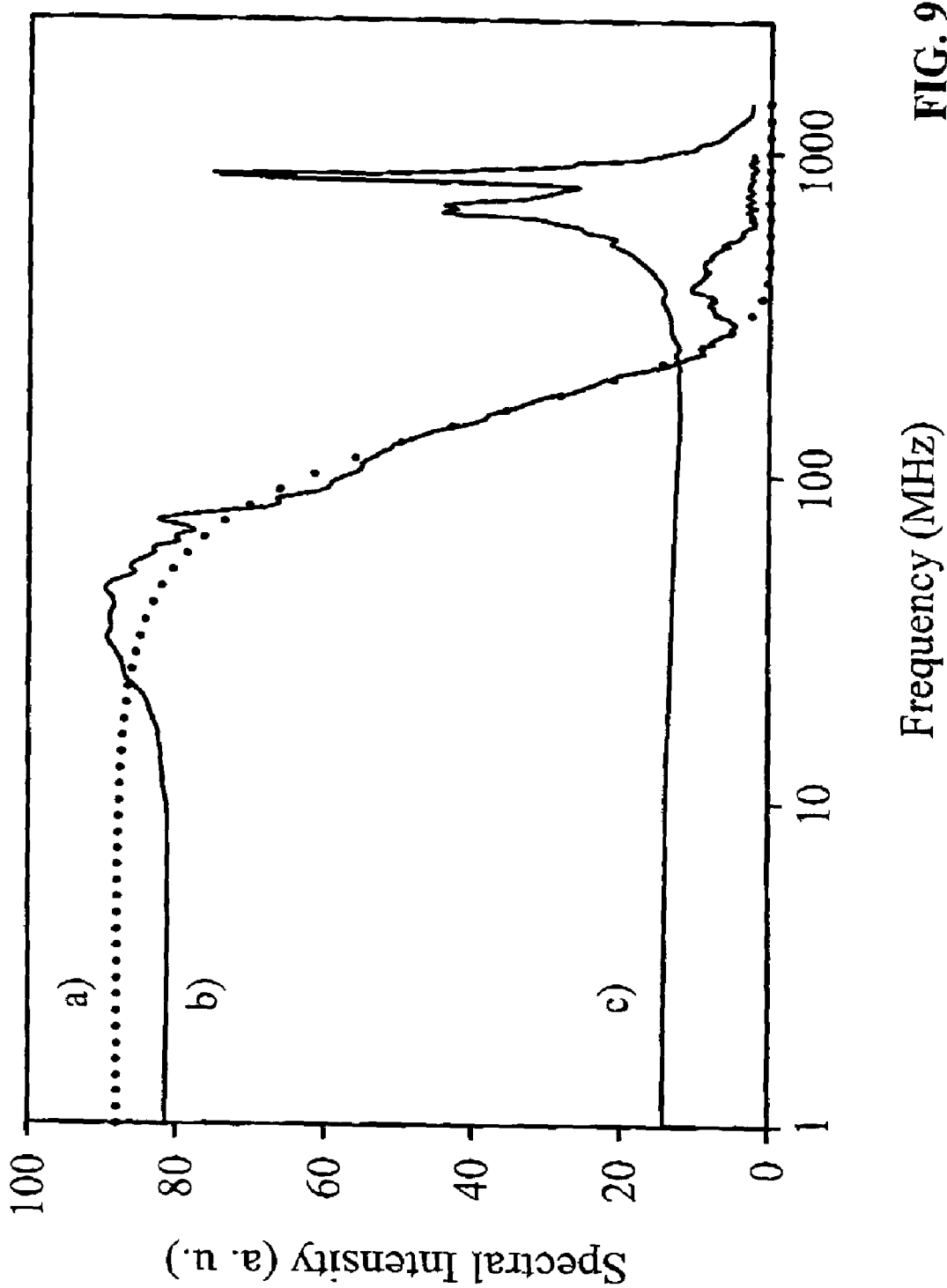
FIG. 9 is a graph depicting the a) calculated and b) measured spectra of a 2.3 ns FWHM gaussian-like electrical pulse, and c) the frequency characteristics of the MO modulator for $b_y$=15 mT.
Figure 10:
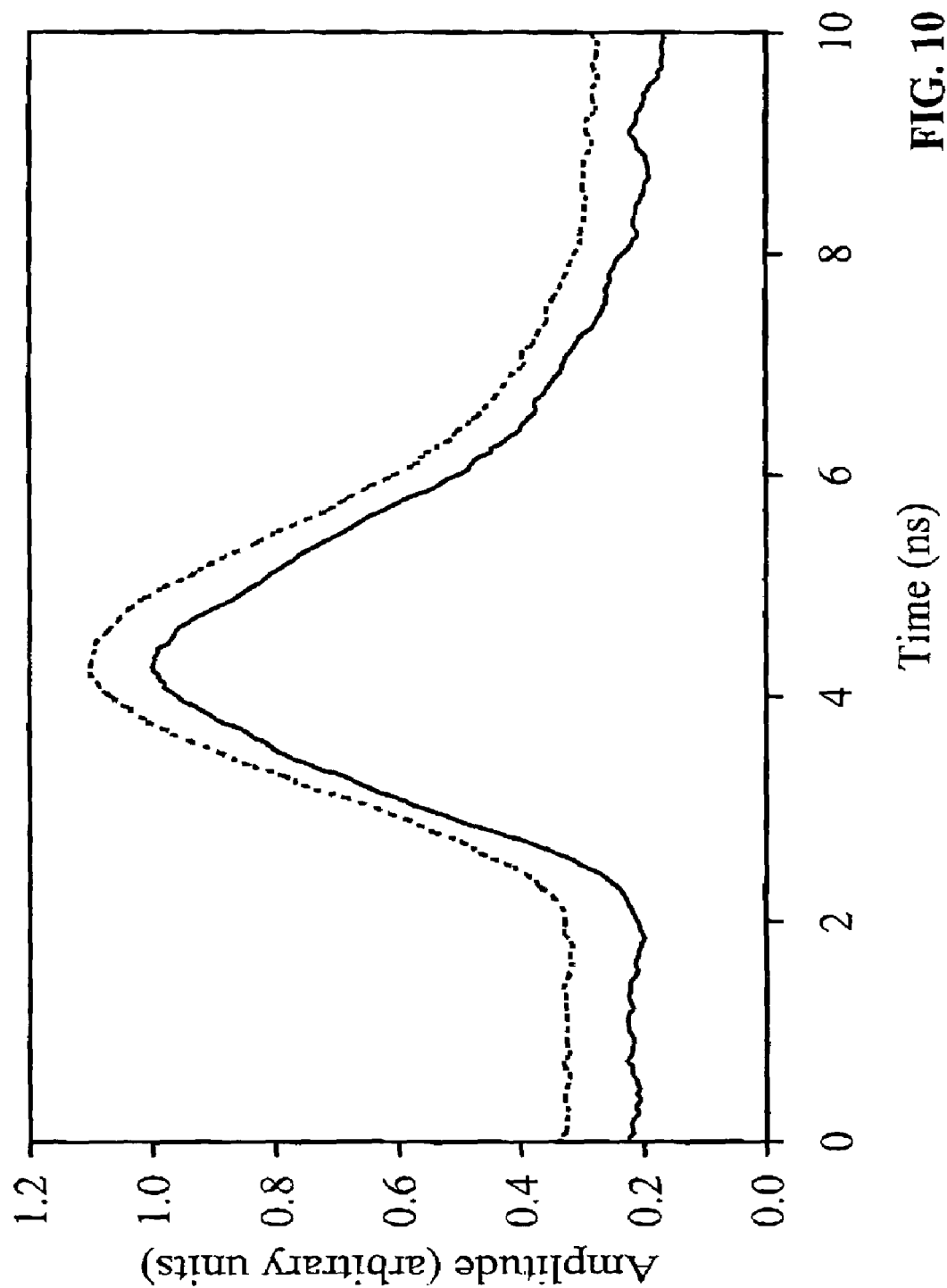
FIG. 10 is a graph of electrical input (dashed line) and optical output (solid line) of the MO modulator.

A unique feature of the MO modulator is that its frequency spectral characteristics can be tuned by altering $b_y$. FIG. 9c displays a typical frequency characteristic curve of the MO modulator for $b_y=15$ mT. Overall, it shows similar characteristics to those of FIG. 8a, except that the FMR frequency is downshifted from 1.5 GHz to 842 MHz. Again, above the 842 MHz resonance the response diminishes to zero, while below it the response is constant up to ~370 MHz. However, the behavior below resonance (≦370 MHz) lends itself well to pulse modulation applications. This is illustrated by a plot in FIG. 9b of the frequency spectrum of a 2.3 ns FWHM gaussian-like electrical pulse fed into the device. As expected, the spectrum lies well below the FMR frequency. Small deviations from a gaussian shape are present in the measured spectrum, but the general shape resembles that of the calculated Fourier transform of a 2.3 FWHM gaussian pulse, curve a) of FIG. 9. For this driving pulse, the time domain output of the MO modulator is displayed in FIG. 10. When superimposed on the electrical driving pulse (dashed line), the modulated output (solid line) offers an excellent representation of the driving signal.

Figure 11:
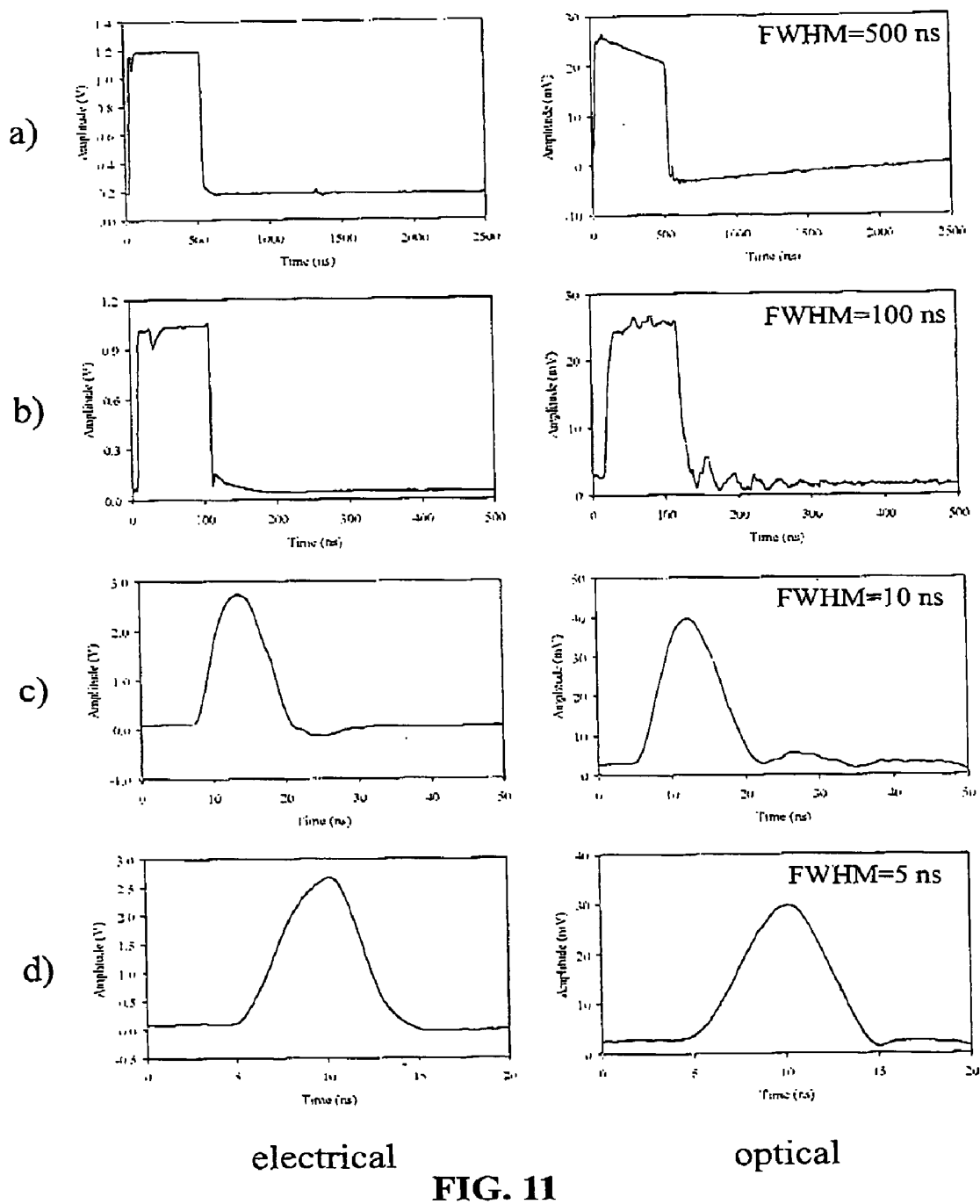
FIG. 11 is a graph depicting several electrical driving pulses and their corresponding measured optical modulation signals, the electrical driving pulses being shown in the left-hand column and the corresponding optical output signal from the MO modulator being shown in the right-hand column.

In addition to this 2.3 ns pulse, the modulator is capable of mapping longer pulses onto the optical carrier. This is shown in FIG. 11, where a variety of electrical pulses are used to drive the MO modulator. In FIG. 11, the driving electrical pulses are shown in the left-hand column and the corresponding optical output signal from the MO modulator is shown in the right-hand column. Various pulse widths are used which are: (a) 500 ns (b) 100 ns (c) 10 ns (d) 5 ns.

Figure 12:
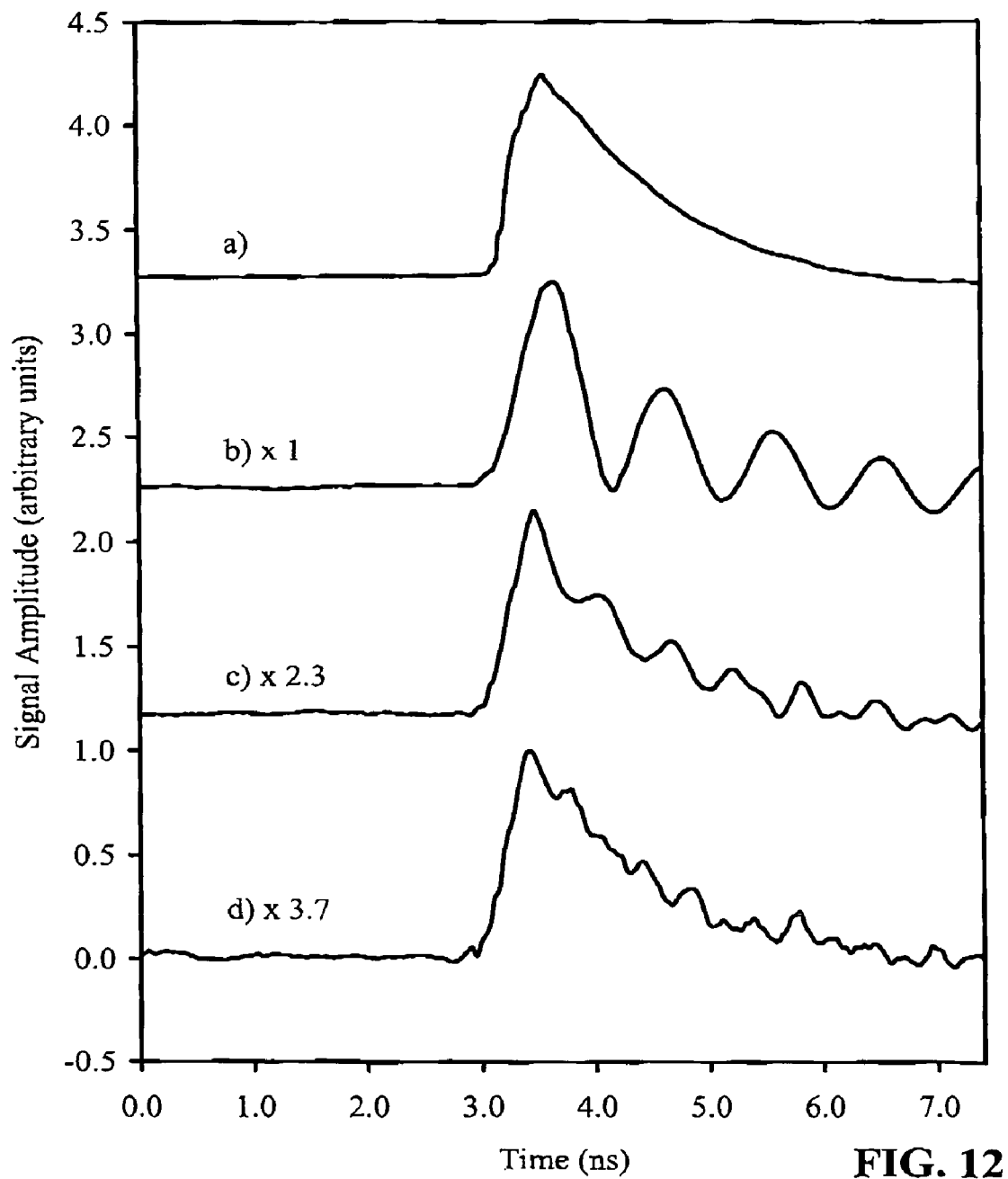
FIG. 12 is a graph of an a) electrical driving pulse with a 10%–90% rise-time of 320 ps, and the corresponding experimental output b), c), d) for $b_y$=22, 39, 52 mT, respectively.

The MO modulator is capable of resolving impulses with much faster rise times. FIG. 12 displays the output of the modulator input with an electrical pulse with a 10%–90% rise time of 320 ps (~2.0 ns fall-time) for various biasing magnetic fields. The MO signal rise-time of 435 ps is ~35% longer than that of the electrical pulse and there is a 1.04 GHz periodic modulation present on the slow fall. These oscillations are attributed to the FMR contributions to the MO signal. Applying a stronger static magnetic field will eliminate the FMR oscillations by shifting the FMR frequency beyond the spectral components of the pulse. A larger biasing field will also shorten the rise-time of the measured optical signal. This is verified in FIG. 12, curves c) and d), where the biasing field has been increased to 39 mT and 52 mT, respectively, and the rise-times are measured to be 357 ps and 343 ps.

Figure 13:
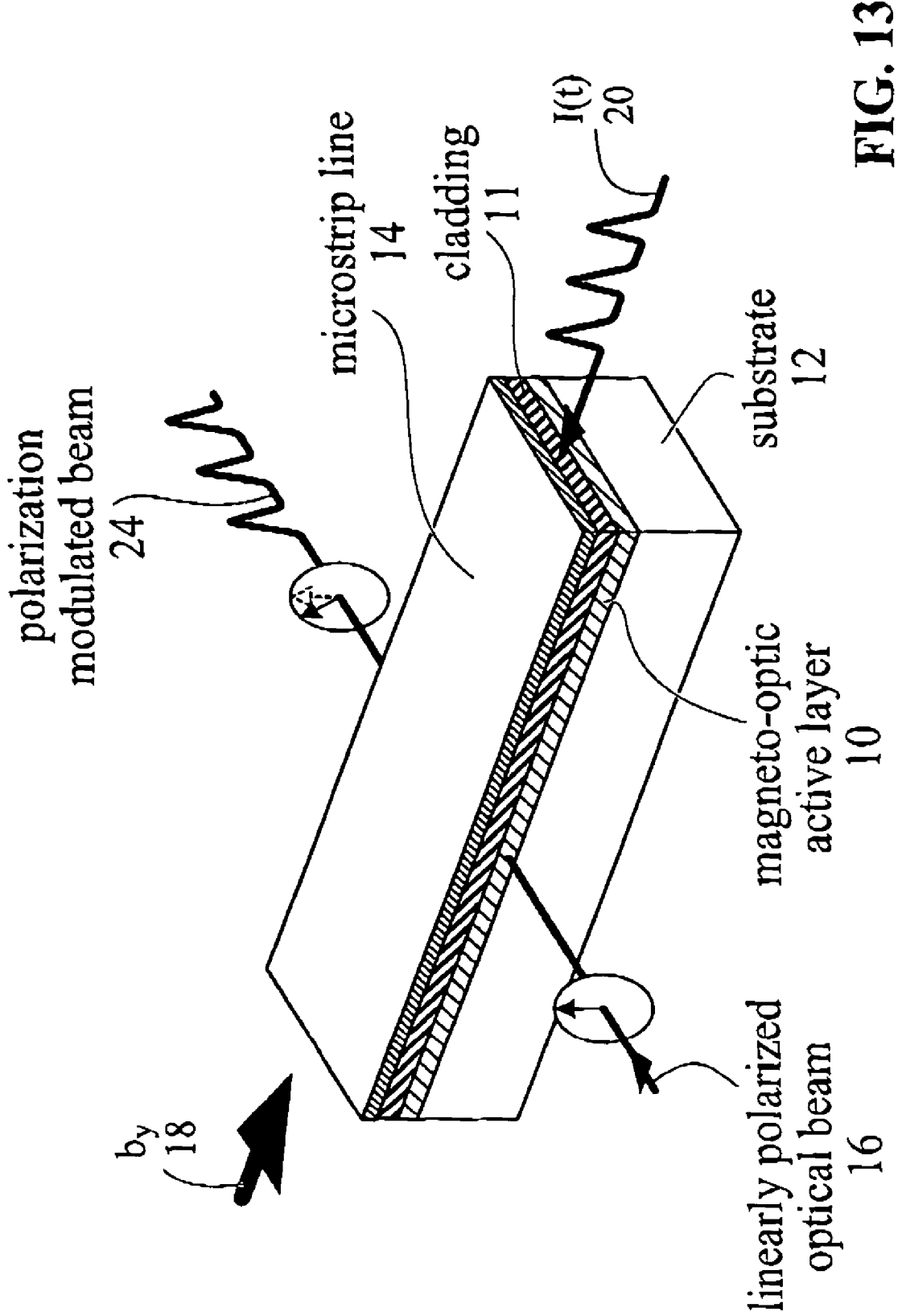
FIG. 13 is a schematic diagram of a Bi-YIG magneto-optic modulator constructed according to an alternate embodiment of the invention.

FIG. 13 illustrates a Bi-YIG magneto-optic modulator constructed according to an alternate embodiment of the invention. In this embodiment, a cladding layer 11 is situated between the microstrip line 14 and the magneto-optic active layer of the optical waveguide 10. As described hereinbefore, the cladding layer 11 would preferably have a similar refractive index as the substrate 12 to effectively confine the lowest order modes in the optical waveguide 10. The thickness of the cladding layer 11 could be, for example, 1.0 μm.

Figure 14:
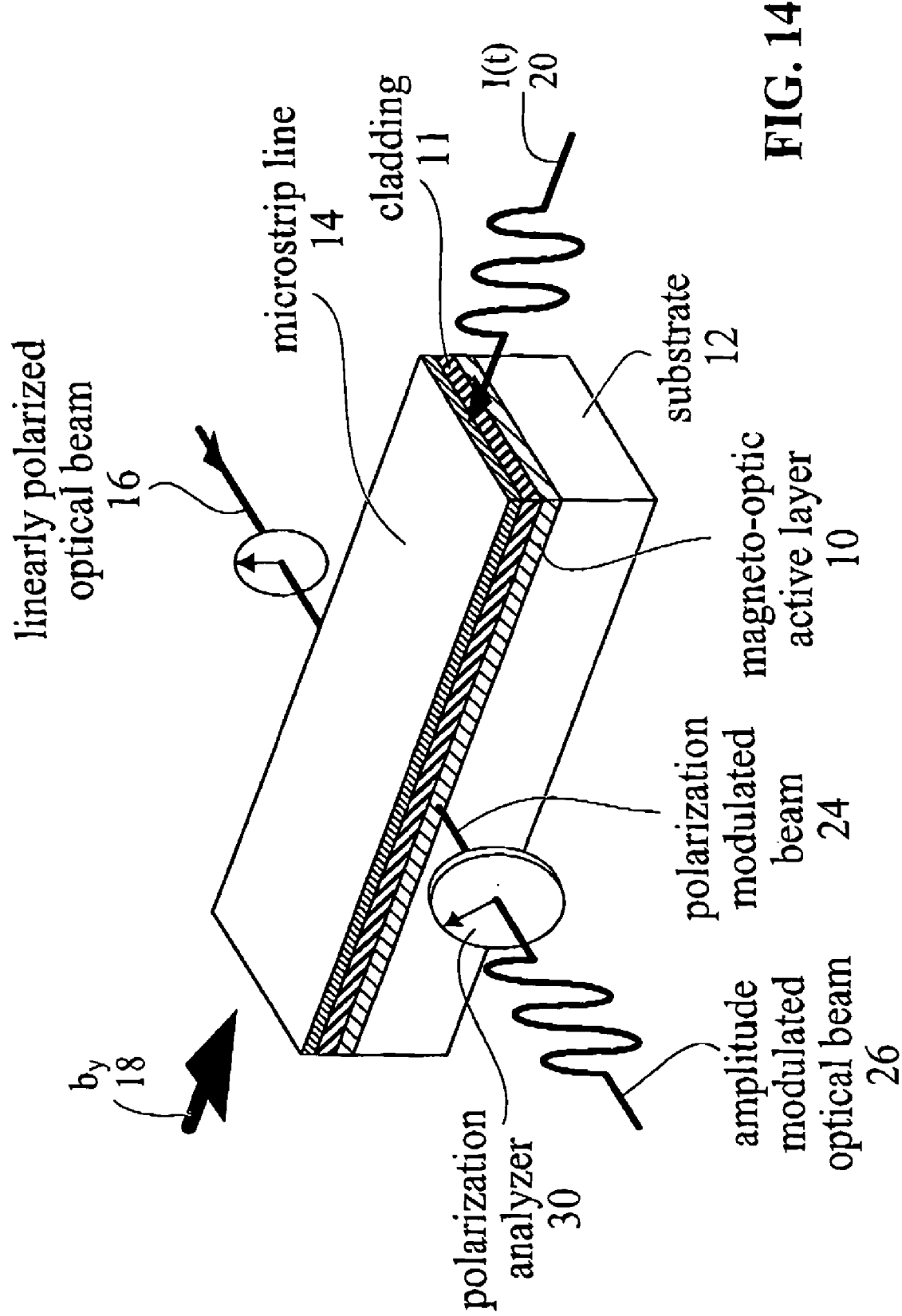
FIG. 14 is a schematic diagram of a Bi-YIG magneto-optic modulator constructed according to a further alternate embodiment of the invention.

FIG. 14 illustrates a Bi-YIG magneto-optic modulator constructed according to a further alternate embodiment of the invention. In this embodiment, a polarization analyzer 30 is used to convert a polarization modulated beam 24 into an intensity or amplitude modulated optical beam 26. The particular form of the intensity variations of the amplitude modulated optical beam 26 will depend upon the magnitude of the biasing magnetic field $b_y$ 18, the time-varying current signal I(t) 20, and the relative angle between the polarization axis of the polarization analyzer 16 and the direction of polarization of the original linearly polarized optical beam 16. The waveform depicted in FIG. 14 is for illustration purposes only, and does not necessarily correspond to an actual output.

It should be noted that the source of the biasing magnetic field could be external to the MO modulator or internal to the structure. As such a biasing magnetic field generator may be internal to the structure itself and under the proper circumstances may be part of MO medium itself. This type of self-applied biasing magnetic field and magnetic field generation is contemplated by the present invention and is not inconsistent therewith.

Numerous modifications and variations of the present invention are possible in light of the above teachings. It is therefore to be understood that within the scope of the appended claims, the invention may be practiced otherwise than as specifically described herein.

We claim:

1. A magneto-optic modulator comprising;
an optical waveguide comprising a magneto-optic active medium;
a biasing magnetic field generator adapted to apply a biasing magnetic field in said magneto-optic active medium; and
a magnetization modulator comprising a conducting microstrip line, the magnetization modulator adapted to modulate a magnetization of the magneto-optic active medium when current is passed through the conducting microstrip line;
whereby during operation of the biasing magnetic field generator, the magnetization modulator causes modulation of an optical signal passing though the optical waveguide.

2. A magneto-optic modulator according to claim 1 wherein the magneto-optic active medium comprises a rare earth element substituted Iron Garnet.

3. A magneto-optic modulator according to claim 1 wherein the magneto-optic active medium comprises Bismuth substituted Yttrium Iron Garnet (Bi-YIG).

4. A magneto-optic modulator according to claim 1 wherein the biasing magnetic field generator is adapted to apply a biasing magnetic field such that the magneto-optic modulator operates in a non-resonant state.

5. A magneto-optic modulator according to claim 1 wherein the biasing magnetic field generator is adapted to apply a biasing magnetic field such that the magneto-optic modulator operates in a resonant state.

6. A magneto-optic modulator according to claim 1 wherein the conducting microstrip line is in direct contact with the magneto-optic active medium.

7. A magneto-optic modulator according to claim 1 wherein the biasing magnetic field is such that it causes a homogeneous static magnetization saturation in the magneto-optic active medium.

8. A magneto-optic modulator according to claim 1 further comprising a polarization analyzer for generating an intensity modulated optical signal.

9. A magneto-optic modulator comprising:
an optical waveguide comprising a magneto-optic active medium;
a biasing magnetic field generator adapted to apply a biasing magnetic field in said magneto-optic active medium; and
a magnetization modulator adapted to modulate a magnetization of the magneto-optic active medium;
wherein:
during operation of the biasing magnetic field generator the optical signal propagates through the optical waveguide in a first direction; and
the biasing magnetic field generated by the biasing magnetic field generator is oriented in a second direction and has a significant component perpendicular to the first direction.

10. A magneto-optic modulator according to claim 9 wherein:
the magnetization modulator comprises a conducting microstrip line oriented in a third direction adapted to generate in the magneto-optic active medium a magnetic field having a significant component parallel to the first direction for modulating the magnetization of the magneto-optic medium when current is passed through said conducting microstrip line;
whereby passing a current signal though said conducting microstrip line during operation of the biasing magnetic field generator modulates the optical signal passing though the magneto-optic active medium.

11. A magneto-optic modulator according to claim 10 wherein the first direction and the second direction are substantially perpendicular to each other, and wherein the second direction and the third direction are substantially parallel to each other.

12. A magneto-optic modulator according to claim 9 wherein the magneto-optic active medium comprises a thin film oriented in a plane defined by the first and second directions.

13. A magneto-optic modulator according to claim 9 further comprising a cladding layer in contact with the magneto-optic active medium, wherein the conducting microstrip line is in contact with the cladding layer.

14. A magneto-optic modulator comprising:
an optical waveguide comprising a magneto-optic active medium;
a biasing magnetic field generator adapted to apply a biasing magnetic field in said magneto-optic active medium; and
a magnetization modulator adapted to modulate a magnetization of the magneto-optic active medium;
wherein the biasing magnetic field generator is adapted to apply a biasing magnetic field having a magnetic field strength such that a signal modulation caused by the magnetization modulator has a Fourier spectrum whose DC to 3-dB point frequencies lie in a relatively flat region of a frequency-amplitude curve of the magneto-optic modulator below a ferromagnetic resonance frequency of the magneto-optic modulator, whereby the magneto-optic modulator operates in a non-resonant state.

15. A magneto-optic modulator comprising:
an optical waveguide comprising a magneto-optic active medium;
a biasing magnetic field generator adapted to apply a biasing magnetic field in said magneto-optic active medium; and
a magnetization modulator adapted to modulate a magnetization of the magneto-optic active medium;
wherein the biasing magnetic field generator is adapted to apply a biasing magnetic field having a magnetic field strength such that a signal modulation caused by the magnetization modulator has a Fourier spectrum whose peak frequencies lie in a peaked region of a frequency-amplitude curve of the magneto-optic modulator substantially at a ferromagnetic resonance frequency of the magneto-optic modulator, whereby the magneto-optic modulator operates in a resonant state.

16. A magneto-optic modulator comprising:
an optical waveguide comprising a magneto-optic active medium;
a biasing magnetic field generator adapted to apply a biasing magnetic field in said magneto-optic active medium; and
a magnetization modulator adapted to modulate a magnetization of the magneto-optic active medium;
wherein the magneto-optic active medium is such that when magnetized it causes a Faraday rotation of polarization states of optical signals propagating through the magneto-optic active medium in a direction non-perpendicular to a direction of magnetization of the magneto-optic active medium.

17. A method of magneto-optic modulation of an optical signal propagating through a magneto-optic active medium, the method comprising:

generating in the magneto-optic active medium a biasing magnetic field to generate a magnetization of the magneto-optic active medium; and generating in the magneto-optic active medium a magnetic field adapted to modulate the magnetization of the magneto-optic medium by passing a current signal through a conducting microstrip line.

18. A method of magneto-optic modulation according to claim 17 wherein the magneto-optic active medium comprises a rare earth element substituted Iron Garnet.

19. A method of magneto-optic modulation according to claim 17 wherein the magneto-optic active medium comprises Bismuth substituted Yttrium Iron Garnet (Bi-YIG).

20. A method of magneto-optic modulation according to claim 17 wherein the biasing magnetic field is such that the step of generating in the magneto-optic active medium a magnetic field adapted to modulate the magnetization of the magneto-optic medium causes a non-resonant state in the magneto-optic medium.

21. A method of magneto-optic modulation according to claim 17 wherein the biasing magnetic field is such that generating in the magneto-optic active medium a magnetic field adapted to modulate the magnetization of the magneto-optic medium causes a resonant state in the magneto-optic medium.

22. A method of magneto-optic modulation according to claim 17 wherein the biasing magnetic field is such that it causes a homogeneous static magnetization saturation in the magneto-optic active medium.

23. A method or magneto-optic modulation according to claim 17 further comprising passing the optical signal through a polarization analyzer after it has passed through the magneto-optic active medium for generating an intensity modulated optical signal.

24. A method of magneto-optic modulation of an optical signal propagating in a first direction through a magneto-optic active medium, the method comprising:
generating in the magneto-optic active medium a biasing magnetic field in a second direction having a significant component perpendicular to the first direction; and
generating in the magneto-optic active medium a magnetic field in a third direction having a significant component parallel to the first direction for modulating a magnetization of the magneto-optic medium.

25. A method of magneto-optic modulation according to claim 24 wherein the first direction and the second direction are substantially perpendicular to each other, and wherein the second direction and the third direction are substantially parallel to each other.

26. A method of magneto-optic modulation according to claim 24 wherein the magneto-optic active medium comprises a thin film oriented in a plane defined by the first and second directions.

27. A method of magneto-optic modulation of an optical signal propagading through a magneto-optic active medium, the method comprising:
generating in the magneto-optic active medium a biasing magnetic field to generate a magnetization of the magneto-optic active medium; and
generating in the magneto-optic active medium a magnetic field adapted to modulate the magnetization of the magneto-optic medium;
wherein the biasing magnetic field has a magnetic field strength such that generating in the magneto-optic active medium a magnetic field adapted to modulate the magnetization of the magneto-optic medium causes an optical signal modulation having a Fourier spectrum whose DC to 3-dB point frequencies lie in a relatively flat region of a frequency-amplitude curve of below a ferromagnetic resonance frequency of the magneto-optic active medium, whereby the magneto-optic medium exhibits a non-resonant state.

28. A method of magneto-optic modulation of an optical signal propagating through a magneto-optic active medium, the method comprising:
generating in the magneto-optic active medium a biasing magnetic field to generate a magnetization of the magneto-optic active medium; and
generating in the magneto-optic active medium a magnetic field adapted to modulate the magnetization of the magneto-optic medium;
wherein the biasing magnetic field has a magnetic field strength such that generating in the magneto-optic active medium a magnetic field adapted to modulate the magnetization of the magneto-optic medium causes an optical signal modulation having a Fourier spectrum whose peak frequencies lie in a peaked region of a frequency-amplitude curve substantially at a ferromagnetic resonance frequency of the magneto-optic active medium, whereby the magneto-optic medium exhibits a resonant state.

29. A method of magneto-optic modulation of an optical signal propagating through a magneto-optic active medium, the method comprising:
generating in the magneto-optic active medium a biasing magnetic field to generate a magnetization of the magneto-optic active medium; and
generating in the magneto-optic active medium a magnetic field adapted to modulate the magnetization of the magneto-optic medium;
wherein the magneto-optic active medium is such that when magnetized it causes a Faraday rotation of polarization states of optical signals propagating through the magneto-optic active medium in a direction non-perpendicular to a direction of magnetization of the magneto-optic active medium.

30. A media for magneto-optic modulation comprising:
a magneto-optic active medium for magneto-optic modulation of an optical signal passing therethrough; and
a conducting microstrip line located proximate to the magneto-optic active medium and adapted to generate a magnetic field for modulating a magnetization of the magneto-optic medium when a current is passed through said conducting microstrip line.

31. A media according to claim 30 wherein the magneto-optic active medium comprises a layer of magneto-optic active material.

32. A media for magneto-optic modulation comprising:
a magneto-optic active medium for magneto-optic modulation of an optical signal passing therethrough; and
a conducting medium located proximate to the magneto-optic active medium and adapted to generate a magnetic field for modulating a magnetization of the magneto-optic medium when a current is passed through said conducting medium;
wherein:
the magneto-optic active medium comprises a layer of magneto-optic active material; and
the conducting medium comprises a layer of conducting material having a surface substantially parallel to a surface of the layer of magneto-optic active material, said surface of the layer of conducting material and said surface of the layer of magneto-optic active material facing each other and being proximate to each other.

33. A media according to claim 32 wherein the surface of the layer of conducting material and the surface of the layer of magneto-optic material are affixed to each other.

34. A media for magneto-optic modulation comprising:
a magneto-optic active medium for magneto-optic modulation of an optical signal passing therethrough; and
a conducting medium located proximate to the magneto-optic active medium and adapted to generate a magnetic field for modulating a magnetization of the magneto-optic medium when a current is passed through said conducting medium;
wherein:
the magneto-optic active medium comprises a layer of magneto-optic active material; and
the surface of the layer of conducting material and the surface of the layer of magneto-optic material are spaced apart by a cladding layer situated therebetween.

* * * * *

UNITED STATES PATENT AND TRADEMARK OFFICE
CERTIFICATE OF CORRECTION

PATENT NO. : 7,133,579 B2 Page 1 of 1
APPLICATION NO. : 10/687763
DATED : November 7, 2006
INVENTOR(S) : Abdulhakem Y. Elezzabi et al.

It is certified that error appears in the above-identified patent and that said Letters Patent is hereby corrected as shown below:

Column 13, line 30, claim 23, "A method or …" should be --A method of …--.

Signed and Sealed this

Twenty-seventh Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,133,579 B2 Page 1 of 1
APPLICATION NO. : 10/687763
DATED : November 7, 2006
INVENTOR(S) : Abdulhakem Y. Elezzabi et al.

It is certified that error appears in the above-identified patent and that said Letters Patent is hereby corrected as shown below:

Column 13, line 30, claim 23, "A method or ..." should be --A method of ...--.

Signed and Sealed this

Sixth Day of March, 2007

JON W. DUDAS
*Director of the United States Patent and Trademark Office*